US011869372B2

(12) United States Patent
Brandao et al.

(10) Patent No.: US 11,869,372 B2
(45) Date of Patent: Jan. 9, 2024

(54) TRANSMITTING AND RECEIVING SURVEILLANCE MESSAGES

(71) Applicant: Honeywell International Inc., Charlotte, NC (US)

(72) Inventors: Ruy C. Brandao, Redmond, WA (US); Eduard Shestak, Redmond, WA (US)

(73) Assignee: Honeywell International Inc., Charlotte, NC (US)

( * ) Notice: Subject to any disclaimer, the term of this patent is extended or adjusted under 35 U.S.C. 154(b) by 367 days.

(21) Appl. No.: 16/949,690

(22) Filed: Nov. 11, 2020

(65) Prior Publication Data
US 2022/0148446 A1    May 12, 2022

(51) Int. Cl.
G08G 5/00    (2006.01)
H04B 7/0408    (2017.01)

(52) U.S. Cl.
CPC ......... *G08G 5/0078* (2013.01); *G08G 5/0008* (2013.01); *H04B 7/0408* (2013.01)

(58) Field of Classification Search
CPC .. G08G 5/0021; G08G 5/0078; G08G 5/0008; H04B 7/0408
See application file for complete search history.

(56) References Cited

U.S. PATENT DOCUMENTS

| | | | |
|---|---|---|---|
| 5,220,329 A | 6/1993 | Verbeke, Jr. et al. | |
| 6,313,783 B1 | 11/2001 | Kuntman et al. | |
| 6,483,453 B2 | 11/2002 | Oey et al. | |
| 6,657,578 B2 | 12/2003 | Stayton et al. | |
| 7,158,073 B2 | 1/2007 | Ybarra | |
| 7,436,350 B1 | 10/2008 | Maloratsky et al. | |
| 7,619,557 B2 | 11/2009 | Billaud et al. | |
| 8,233,412 B1 * | 7/2012 | Abbey | H04B 1/001 370/256 |
| 8,738,064 B2 | 5/2014 | Hofmann et al. | |

(Continued)

FOREIGN PATENT DOCUMENTS

| | | | | |
|---|---|---|---|---|
| CN | 103682558 | | 3/2014 | |
| EP | 524099 A1 * | 1/1993 | ........... | G01S 13/781 |
| WO | 201935924 A1 | 2/2019 | | |

OTHER PUBLICATIONS

Harman, W. H., TCAS-II: Design and Validation of the High-Traffic-Density Surveillance Subsystem, 1985, Lincoln Laboratory (Year: 1985).*

(Continued)

*Primary Examiner* — Nguyen H Ngo

(74) *Attorney, Agent, or Firm* — Shumaker & Sieffert, P.A.

(57) ABSTRACT

In some examples, a system is configured to mount on a first vehicle. The system include an antenna configured to transmit a first surveillance message by forming an omni-directional beam. The antenna is also configured to receive a second surveillance message from a second vehicle during a first time period. The antenna is further configured to receive a third surveillance message from a third vehicle during a second time period, where the first and second time periods at least partially overlap in time. The system also includes processing circuitry configured to demodulate the second surveillance message by forming a first beam and demodulate the third surveillance message by forming a second beam. The second beam is different than the first beam, and the first beam is simultaneous with the second beam.

20 Claims, 6 Drawing Sheets

(56) References Cited

U.S. PATENT DOCUMENTS

| | | | |
|---|---|---|---|
| 9,100,087 B2 | 8/2015 | Stayton | |
| 9,791,562 B2* | 10/2017 | Stayton | H04L 5/02 |
| 9,869,745 B1 | 1/2018 | Rowlan | |
| 9,997,826 B2 | 6/2018 | Oey | |
| 10,132,923 B2 | 11/2018 | Robin | |
| 10,451,725 B2 | 10/2019 | Kirk | |
| 10,785,607 B2* | 9/2020 | Balasubramanian | H04W 4/40 |
| 10,795,016 B2 | 10/2020 | Hauswald et al. | |
| 11,041,950 B2 | 6/2021 | Troxel | |
| 11,156,708 B2 | 10/2021 | McCullen et al. | |
| 2004/0242273 A1* | 12/2004 | Corbett | H04B 7/0837 |
| | | | 455/562.1 |
| 2011/0215963 A1* | 9/2011 | Perl | G01S 13/878 |
| | | | 342/427 |
| 2017/0259942 A1* | 9/2017 | Ziarno | G07C 5/085 |
| 2018/0137765 A1 | 5/2018 | Sindlinger et al. | |
| 2018/0321370 A1* | 11/2018 | Robin | G01S 13/781 |
| 2019/0045406 A1* | 2/2019 | Kalathil | G05D 1/102 |
| 2019/0061693 A1 | 2/2019 | Johnson | |
| 2019/0098458 A1* | 3/2019 | Perdew | H04W 4/027 |
| 2019/0162841 A1 | 5/2019 | Peckham | |
| 2019/0334604 A1* | 10/2019 | Kusano | H04W 52/02 |
| 2020/0351790 A1* | 11/2020 | Hsieh | H04W 52/0245 |
| 2021/0124375 A1* | 4/2021 | Li | G08G 5/045 |

OTHER PUBLICATIONS

Harman, W. H., TCAS-II: Design and Validation of the High-Traffic-Density Surveillance Subsystem, 1985, Lincoln Labatory (Year: 1985).*

U.S. Department of Transportation, "Introduction to TCAS II," Version 7.1, HQ-111358, Feb. 28, 2011, 50 pp.

U.S. Appl. No. 16/568,708, by Honeywell International Inc. (Inventors: Ferguson et al.), filed Sep. 12, 2019.

U.S. Appl. No. 16/850,343, by Honeywell International Inc. (Inventors: Brandao et al.), filed Apr. 16, 2020.

Williamson et al., "Development and Operation of the Traffic Alert and Collision Avoidance System," 8078 Proceedings of the IEEE, vol. 77, No. 11, Nov. 1989, 10 pp.

U.S. Appl. No. 16/892,029, by Honeywell International Inc. (Inventor: Brandao), filed Jun. 3, 2020/.

Sections 2.2.3.4 through 2.2.3.6.4 of Radio Technical Commission for Aeronautics DO-185B, Jun. 19, 2008, 7 pp.

* cited by examiner

TRANSMITTING AND RECEIVING SURVEILLANCE MESSAGES

TECHNICAL FIELD

This disclosure relates to surveillance communication for vehicles.

BACKGROUND

A vehicle may transmit and receive surveillance messages using a transceiver system. For example, a transceiver system mounted on a vehicle can transmit a first surveillance message indicating a position and velocity of the vehicle. Alternatively, the first surveillance message may be an interrogation message with a request for another vehicle to send a reply message with the altitude of the other vehicle. The transceiver system may receive a second surveillance message indicating an altitude of another vehicle, whether the second surveillance message is a reply message or reply to a different interrogator transmitted by the other vehicle.

As an example implementation, some aircraft include a traffic collision avoidance system (TCAS) device configured to transmit an interrogation message using, for example, Mode C protocol. The interrogation message may be encoded at 1030 MHz. Another aircraft that receives the Mode C interrogation message can respond with a Mode C reply message indicating its altitude. The Mode C reply message may be encoded at 1090 MHz. The TCAS device demodulates the Mode C reply message to determine the altitude of the other aircraft.

SUMMARY

In general, this disclosure relates to transmitting and receiving surveillance messages. The transmission of surveillance messages may be performed using an omni-directional beam, while the receipt of surveillance messages may be performed using multiple, simultaneous beams. In some examples, transmitting with an omni-directional beam may allow for the use of a less complex transmitter, as compared to transmitting with multiple beams. Receiving with multiple, simultaneous beams may allow for de-garbling surveillance messages that at least partially overlap in time.

In some examples, a system is configured to mount on a first vehicle. The system includes an antenna configured to transmit a first surveillance message by forming an omni-directional beam. The antenna is also configured to receive a second surveillance message from a second vehicle during a first time period. The antenna is further configured to receive a third surveillance message from a third vehicle during a second time period, where the first and second time periods at least partially overlap in time. The system also includes processing circuitry configured to demodulate the second surveillance message by forming a first beam and demodulate the third surveillance message by forming a second beam. The second beam is different than the first beam, and the first beam is simultaneous with the second beam.

In some examples, a method includes transmitting, by an antenna mounted on a first vehicle, a first surveillance message by forming an omni-directional beam. The method also includes receiving, by the antenna, a second surveillance message from a second vehicle during a first time period. The method further includes receiving, by the antenna, a third surveillance message from a third vehicle during a second time period, wherein the first and second time periods at least partially overlap in time. The method includes demodulating, by processing circuitry coupled to the antenna, the second surveillance message by forming a first beam. The method also includes demodulating, by the processing circuitry, the third surveillance message by forming a second beam, wherein the second beam is different than the first beam, and wherein the first beam is simultaneous with the second beam.

In some examples, a traffic collision avoidance system (TCAS) device is configured to mount on a first vehicle. The TCAS device includes an antenna configured to transmit a Mode C interrogation message and receive one or more Mode C reply messages from other vehicles. The TCAS device also includes processing circuitry configured to demodulate the one or more Mode C reply messages by forming two or more simultaneous beams.

The details of one or more examples of the disclosure are set forth in the accompanying drawings and the description below. Other features, objects, and advantages will be apparent from the description, drawings, and claims.

DETAILED DESCRIPTION

Various examples are described below for transmitting and receiving surveillance messages. An ownship vehicle may carry a system that can transmit surveillance messages such as interrogation messages requesting data from other vehicles. The system can also receive surveillance messages from other vehicles, where the received surveillance messages may be replies to the interrogation message and may indicate the altitudes of the other vehicles. The system may transmit surveillance messages using an omni-directional beam and receive surveillance messages using multiple, simultaneous beams.

Existing systems mounted onboard ownship vehicles transmit an interrogation message using a directional beam to reduce the number of vehicles that send back reply messages to the ownship. For example, an existing system may form a single beam on transmit to focus on vehicles on a single area and elicit replies from only those vehicles. In addition, existing systems form a single omni-directional beam on receive to demodulate any reply messages received by the ownship. Existing systems also use whisper-shout techniques for eliciting reply messages from target vehicles in specific areas and with specific receiver sensitivities.

Figure 1:
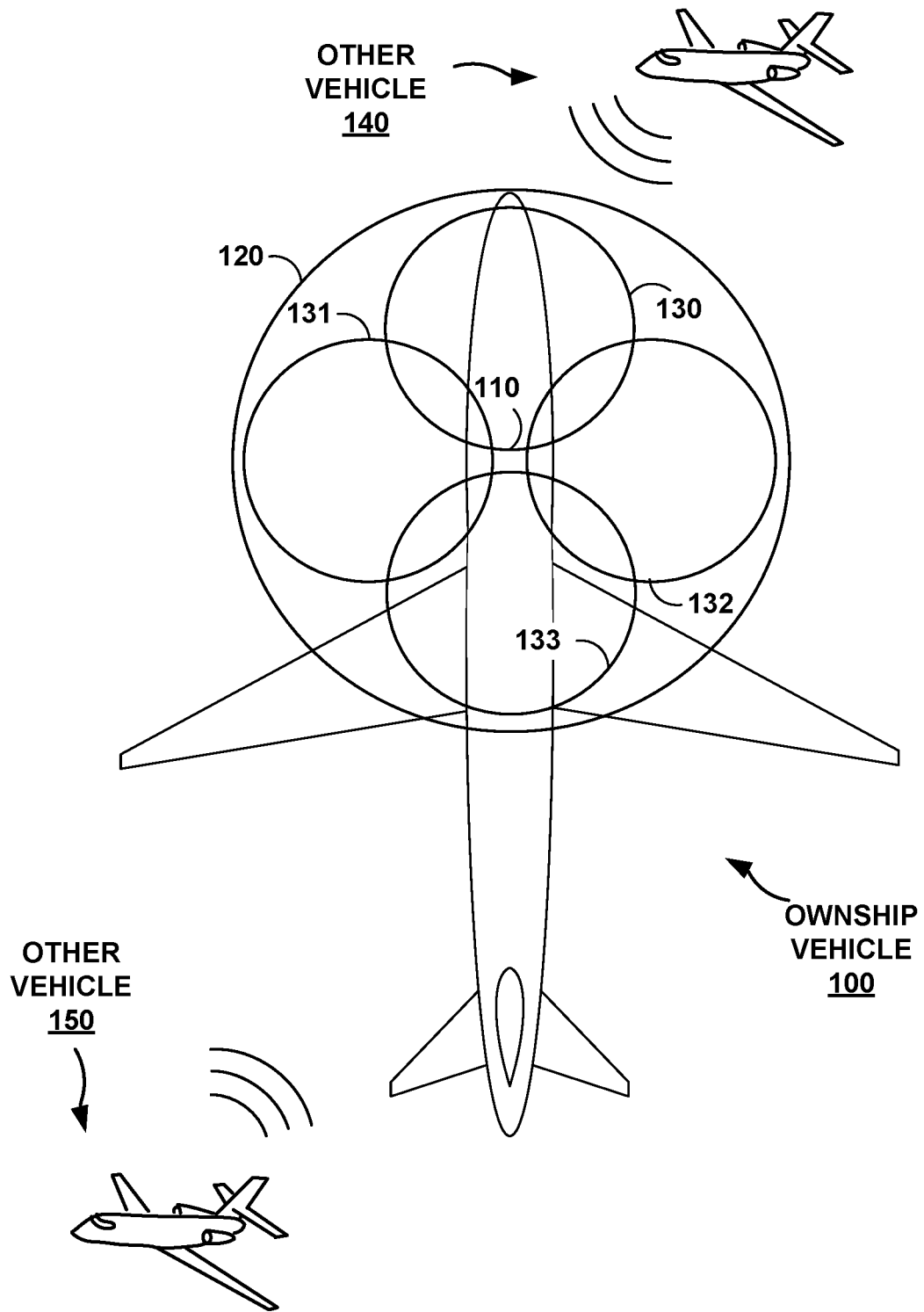
FIG. 1 is a conceptual block diagram of a system for transmitting and receiving surveillance messages, in accordance with some examples of this disclosure.

FIG. 1 is a conceptual block diagram of a system 110 for transmitting and receiving surveillance messages, in accordance with some examples of this disclosure. System 110 is shown in FIG. 1 as being mounted on ownship vehicle 100. System 110 may include one or more antennas and processing circuitry, which are not shown in FIG. 1. System 110 is configured to send surveillance message to vehicles 140 and 150 and receive surveillance messages from vehicles 140 and 150. Additionally or alternatively, system 110 may be capable of receiving surveillance messages from vehicles and/or non-moving entities, such as base stations or traffic control systems. Example traffic control systems include Air Traffic Controller (ATC) systems and autonomous vehicle traffic management systems.

Although FIG. 1 depicts system 110 as mounted on an aircraft (ownship vehicle 100) as one example, system 110 can be mounted on any vehicle or in a stationary environment, such as a traffic control center or a base station. In some examples, system 110 may be configured to mount on an aircraft such as an unmanned aerial vehicle (UAV), an airplane, a helicopter, or a weather balloon. System 110 may be configured to mount on space vehicles such as satellites or spaceships, land vehicles such as automobiles, and/or water vehicles such as ships or submarines. System 110 may be configured to mount on manned vehicles or unmanned vehicles, such as drones, remote-control vehicles, urban air mobility (UAM) systems, or any suitable vehicle with or without a pilot or crew on board. The term "ownship" denotes that the ownship vehicle is equipped with a system of this disclosure. The operation and capabilities of the system are described with respect to ownship vehicle 100, but other vehicles such as vehicles 140 and 150 may also be equipped with a system of this disclosure.

FIG. 1 depicts system 110 as being mounted at a single location on ownship vehicle 100. However, in some examples, system 110 may be mounted in another location on ownship vehicle 100, such as the nose or the tail of ownship vehicle 100. System 110 may be mounted at a single location, or the components of system 110 may be distributed across multiple locations on ownship vehicle 100. For example, system 110 may include a first antenna mounted on a top side of ownship vehicle 100 and a second antenna mounted on an underneath side of ownship vehicle 100. The minimum operational performance standards for surveillance systems may require the top antenna to be directional while the bottom antenna can be omni-directional.

System 110 may be configured to transmit and receive surveillance messages using one or more communication systems, devices, and/or protocols such as traffic collision avoidance system (TCAS), automatic-dependent surveillance—broadcast (ADS-B), Mode A, Mode C, Mode S, universal access transceiver (UAT), automatic identification system (AIS), and/or any other type of position reporting, including a reporting protocol for automobiles. For example, system 110 may be configured to send a surveillance message as an interrogation message requesting information from vehicles 140 and 150, a reply message to an interrogation message received from vehicle 140 or 150, and/or a broadcast message. In some examples, the interrogation message is a Mode C interrogation message. A broadcast message may be an unprompted message including position and velocity data sent by a vehicle at, for example, a regular interval. Likewise, system 110 may receive surveillance messages from vehicles 140 and 150 that are interrogations, replies, and/or broadcasts. Each surveillance message may encode data within a predefined frequency band. In some examples, the surveillance messages sent by vehicles 140 and 150 may be Mode C reply messages in response to the Mode C interrogation messages.

For example, a TCAS device onboard vehicle 100 may be configured to transmit Mode C interrogation messages to track other vehicles that are equipped have an air traffic control radar beacon system transponder. The TCAS device onboard vehicle 100 may be configured to transmit Mode S interrogation messages and receive Mode C reply messages from other vehicles. In some examples, the TCAS device can use the elicited Mode C reply messages to track aircraft equipped with Mode S transponders. A TCAS device may include a system that is configured to interrogate transponders mounted on other vehicles. Additionally or alternatively, the TCAS device may be able to use ADS-B to track other vehicles that are equipped with ADS-B capabilities, but ADS-B-equipped vehicles are typically also equipped with a transponder for replying to TCAS interrogations. In the example of ADS-B messages, each surveillance message may include a data packet or a payload with data such as the location and/or velocity of the transmitting entity, where the location may include the latitude, longitude, and altitude of a vehicle.

System 110 may be configured to transmit surveillance messages by forming omni-directional beam 120. Omni-directional beam 120 may radiate approximately equal power in all directions perpendicular to an axis of the antenna. System 110 may be configured to form an omni-directional transmit beam by delivering a signal to only one port of an antenna. In some examples, the circuitry and hardware used for forming an omni-directional beam may be simpler and less expensive than the circuitry and hardware used for forming directional transmit beams.

Figure 2A:
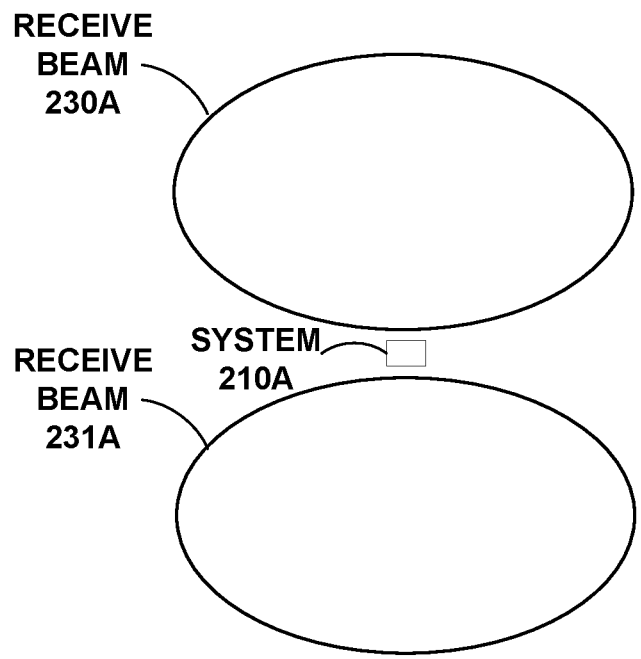
FIGS. 2A and 2B are conceptual diagrams of simultaneous receive beams for demodulating surveillance messages, in accordance with some examples of this disclosure.
Figure 2B:
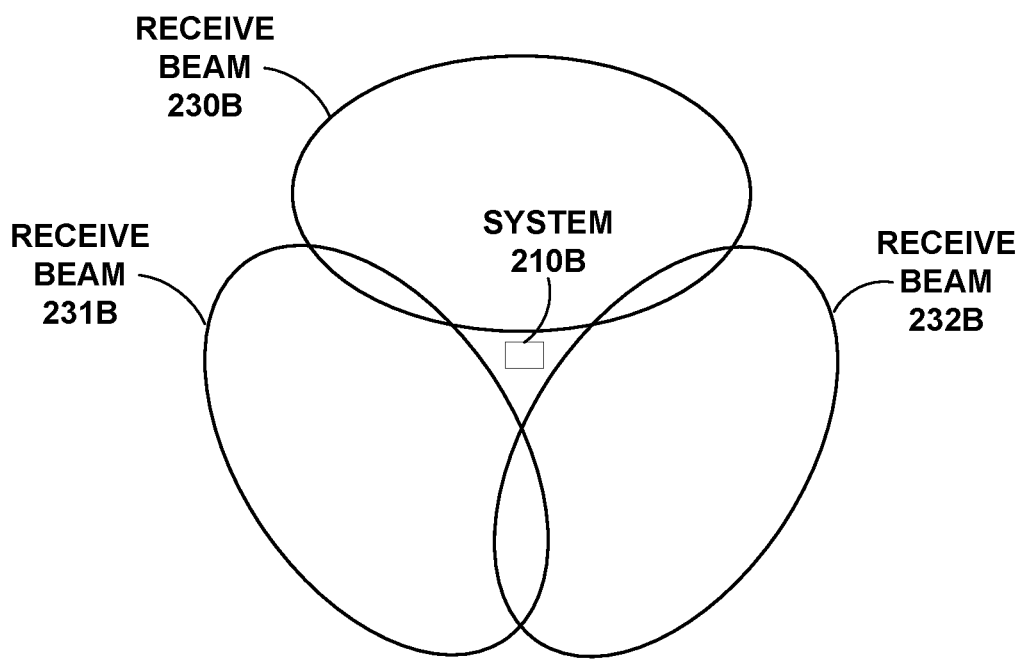
Figure 3:
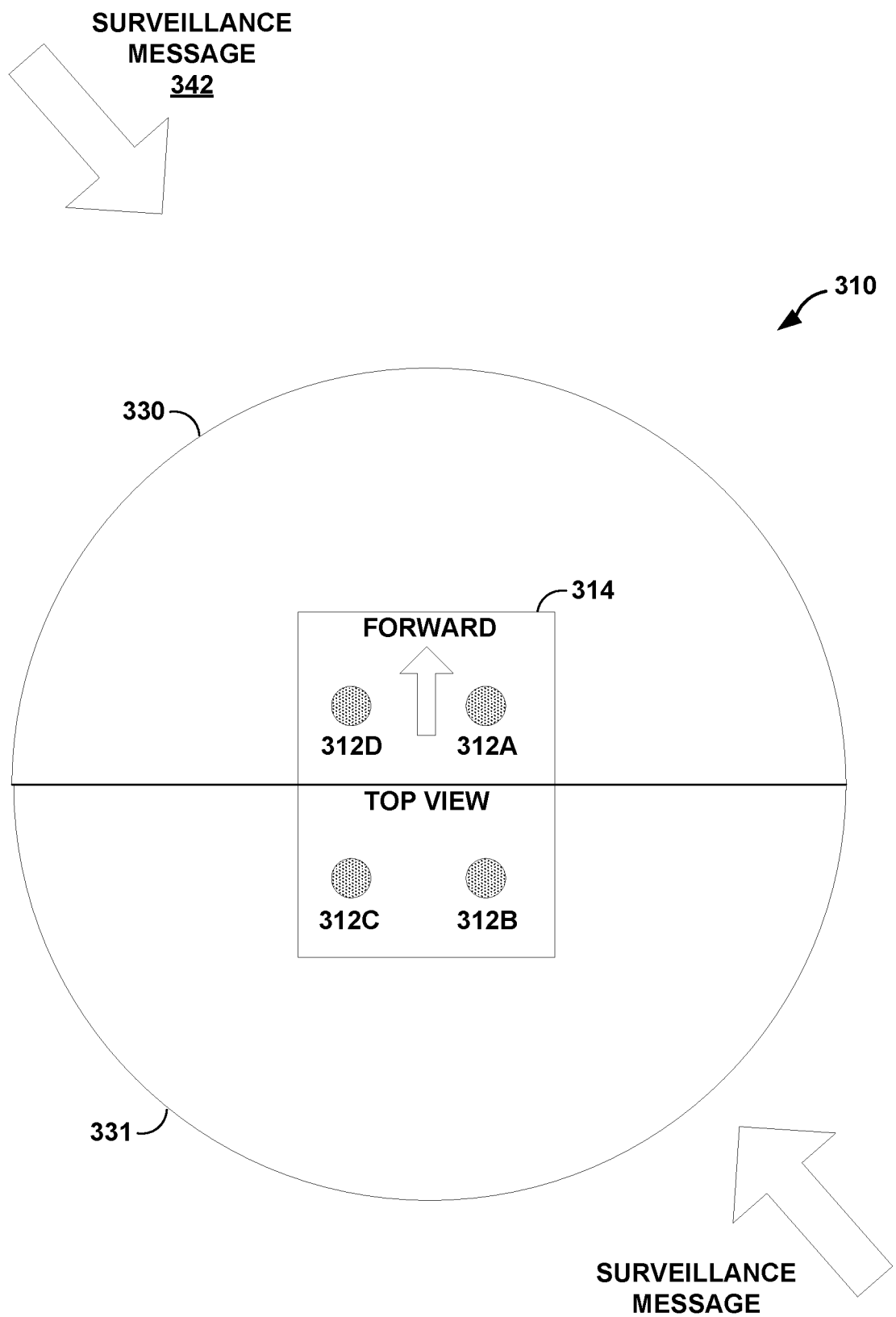
FIG. 3 is a conceptual diagram illustrating an example antenna system and receive pattern, in accordance with some examples of this disclosure.

System 110 is configured to receive surveillance messages from vehicles 140 and 150. System 110 may include receive circuitry configured to demodulate the surveillance messages received from vehicles 140 and 150 by forming multiple, simultaneous beams 130-133. Although FIG. 1 depicts system 110 as forming four simultaneous beams 130-133, system 110 may be configured to form any number of simultaneous beams, such as two, three, four, five, or more simultaneous receive beams. FIGS. 2A, 2B, and 3 illustrate examples of beamforming for demodulating surveillance messages.

FIG. 1 depicts each of beams 130-133 as having a beamwidth of 90 degrees. Alternatively, each of beams 130-133 may have a bandwidth of 120 degrees or a bandwidth of 180 degrees. For example, system 110 may be configured to form four beams, where each beam is 90 degrees wide. Additionally or alternatively, system 110 may be configured to form four beams spaced at every 90 degrees, where the beamwidth of each beam is greater than 90 degrees (e.g., 180 degrees). Although two or more of the beams may overlap, the minimums or nulls of the beams do not overlap, which provides additional de-garbling performance. System 110 may be configured to form beams 130-133 with orientations and beam widths to provide 360-degree coverage at a minimum (e.g., optionally with overlapping coverage) to avoid any gaps in coverage. In some examples, system 110 may form the simultaneous receive beams at equally spaced directions.

Some existing vehicles use directional transmissions for interrogation messages to reduce the likelihood of garble from multiple replies to the same interrogation. Some industry standards require the use of directional interrogation messages for TCAS II to reduce the number of vehicles that send reply messages back to the vehicle that transmitted the interrogation message. For example, an omni-directional beam used for the transmission of a Mode C interrogation message could result in garble when multiple ATC radar beacon system (ATCRBS) transponders reply to the interrogation message. A system using an omni-directional receive beam may experience garbling when the received messages overlap in time. System 110 can transmit a surveillance message by forming an omni-directional beam, but garble may still exist, even where the number of ATCRBS-equipped transponder aircraft is low.

Garble refers to the error, interference, or overlap caused by two overlapping messages that are received by system 110. For example, a first surveillance message transmitted by vehicle 140 arrives at system 110 during a first time period, a second surveillance message transmitted by vehicle 140 arrives at system 110 during a second time period, and the first and second time periods may partially or fully overlap. The overlap may result in interference experienced by the antenna of system 110 as the energy from both messages arrive at system 110. Garble also can refer to two reply messages that overlap, where the two reply messages are each in response to the same interrogation message. For example, the first and second surveillance messages sent by vehicles 140 and 150 may both be in reply to the same interrogation message transmitted by system 110. An existing system that uses omni-directional listening may experience corrupted signals or canceled out signals because the surveillance messages sent by vehicles 140 and 150 partially or fully overlap.

In accordance with the techniques of this disclosure, system 110 may be configured to form multiple, simultaneous directional receive beams 130-133 to reduce the occurrence of garble. By forming multiple, simultaneous directional receive beams 130-133, system 110 can de-interleave, separate out, and/or discriminate between surveillance messages sent by vehicles 140 and 150. A sectorized antenna or simultaneous sectorized receive beamforming can separate out the signals from vehicles 140 and 150 and increase the likelihood that the messages received from both of vehicles 140 and 150 can be decoded without any errors by system 110.

The reduction in the occurrence of garble allows for omni-directional transmissions. Omni-directional transmissions have not previously been used exclusively for interrogations because an omni-directional transmission may be received by a larger number of vehicles, thereby triggering a larger number of replies that are more likely to be overlapping when received by ownship vehicle 100. Omni-directional transmission can be performed by lower-cost transmitters (e.g., lower-cost hardware and circuitry), which means that system 110 may be less expensive than existing systems. In some examples, system 110 may be configured to perform omni-directional transmissions using a single antenna onboard ownship vehicle 100 or perform omni-directional transmissions using multiple antennas onboard ownship vehicle 100.

FIGS. 2A and 2B are conceptual diagrams of simultaneous receive beams 230A, 231A, and 230B-232B for demodulating surveillance messages, in accordance with some examples of this disclosure. FIG. 2A depicts system 210A as forming two simultaneous beams 230A and 231A, where each of beams 230A and 231A has a beamwidth of one hundred and eighty degrees. FIG. 2B depicts system 210B as forming three simultaneous beams 230B-232B, where each of beams 230B-232B has a beamwidth of one hundred and eighty degrees, resulting in some overlap between adjacent beams 230B-232B. Each of systems 210A and 210B may be described as including a sectorized antenna because of the beamforming techniques performed by systems 210A and 210B.

A system of this disclosure may be configured to form simultaneous receive beams, where the adjacent receive beams have significant, limited, or no overlap. Forming beams with no overlap may result in cleaner demodulation of received signals, as compared to beams with overlap, but no overlap among the beams may create surveillance holes or coverage gaps. In contrast, forming wider beams with some overlap allows for more coverage, so that signals received from all directions will exist within at least one beam. However, wider beams may result in a greater likelihood of garble where a surveillance message is received from a direction covered by multiple beams.

Systems 110, 210A, and 210B may be configured to form relatively wide beams with beamwidths between 160 and 200 degrees. In some examples, systems 110, 210A, and 210B may be configured to form beams that are even wider than 200 degrees. In examples in which more than two simultaneous beams are formed, systems 210A and/or 210B may be configured to form narrower simultaneous beams, such as beams having beamwidths between 100 and 140 degrees or between 70 and 110 degrees. For example, system 210A can form beams 230A and 231A by performing the processing of beams 230 simultaneously or quickly enough that the processing appears simultaneous.

Systems 210A and 210B may be configured to form beams 230A, 231A, and 230B-232B as simultaneous beams that can be processed or analyzed at the same time, in parallel, or nearly simultaneously. Thus, system 210A may be configured to demodulate the signals received in beam 230A simultaneously with demodulating the signals received in beam 231A. Demodulating refers to the process of extracting data from a received radio-frequency signal, including some or all of the following operations: filtering, down-converting, analog-to-digital converting, and Fourier transforming.

FIG. 3 is a conceptual diagram illustrating an example antenna system and receive pattern, in accordance with some examples of this disclosure. System 310, in the example of FIG. 3, is an example physical layout of a four-element antenna according to one or more techniques of this disclosure. In other examples, system 310 may have more or fewer than four antenna elements. In the example of FIG. 3, system 310 includes housing 314 that may provide structural support for antenna elements 312A-312D. In some examples, housing 314 may contain and provide protection for circuitry such as a beamforming network, connection ports, and other components of antenna system 310.

System 310 includes an omni-directional beam transmit beam and two simultaneous receive beams 330 and 331. In the example shown in FIG. 3, each of beams 330 and 331 spans approximately 180 degrees. In the example of FIG. 3, beam 330 covers the forward or front direction, and beam 331 covers the aft, backward, or rearward direction, i.e. toward the tail of an aircraft or other vehicle. In other examples, complementary simultaneous receive beams may cover any direction. Complementary receive beams that cover two directions may, for example, be desirable for de-garbling replies to the same TCAS Mode C interrogation. The beam width of either or both of beams 330 and 331 may be greater than 180 degrees in some examples, or less than 180 degrees in other examples. Complementary directions may also be described as substantially opposite directions in this disclosure, such that the complementary transmit beams do not overlap or only have minimal overlap.

The direction of a 180-degree beam may be controlled by the phase relationship, amplitude, or a combination of phase and amplitude between the signals received by the ports (not shown in FIG. 3) of the multiple-port antenna. In some examples, the direction of beams 330 and 331 from system 310 is predefined to be in two complementary directions. In other examples, system 310 can form beams in non-complementary directions. System 310 may be configured to form four simultaneous beams that are each approximately 180 degrees wide, where the four beams may be spaced at ninety degrees apart. Four 180-degree beams can provide ample coverage, reducing the potential for gaps, as compared to four beams with narrower coverage.

Antenna elements 312A-312D may be arranged such that a received signal at system 310 may have differences in timing, phase etc. between the different antenna elements. For example, surveillance message 342 may arrive at antenna element 314D before antenna element 312B receives surveillance message 342. Therefore, there may be a phase difference between the signal conducted to a beamforming network of system 310 from antenna element 312D and antenna element 312B. Processing circuitry coupled to system 310 may use these differences to calculate one or more characteristics of surveillance message 342, such as an angle of arrival.

As another example, surveillance message 352 may arrive at antenna element 314B before antenna element 312D receives surveillance message 352. Therefore, there may be a phase difference between the signal conducted to a beamforming network of system 310 from antenna element 312B and antenna element 312D. Processing circuitry coupled to system 310 may use these differences to calculate one or more characteristics of surveillance message 352, such as an angle of arrival.

Each of antenna elements 314A-314D may be configured to receive RF energy (e.g., messages encoded in L-band signals). Antenna elements 314A-314D may include patch antennas integrated onto a circuit board, top-hat antennas, phased-array antennas, and/or any other type of antenna elements. Additional example details of antennas in a receiver system are described in commonly assigned U.S. patent application Ser. No. 16/568,708, entitled "Multi-Element Antenna Array with Integral Comparison Circuit for Phase and Amplitude Calibration," filed on Sep. 12, 2019, U.S. patent application Ser. No. 16/850,343, entitled "Simplified TCAS Surveillance," filed on Apr. 16, 2020, and U.S. patent application Ser. No. 16/892,029, entitled "Interference Limiting for Surveillance Messages," filed on Jun. 3, 2020, the entire contents of each of which are incorporated herein by reference.

Figure 4:
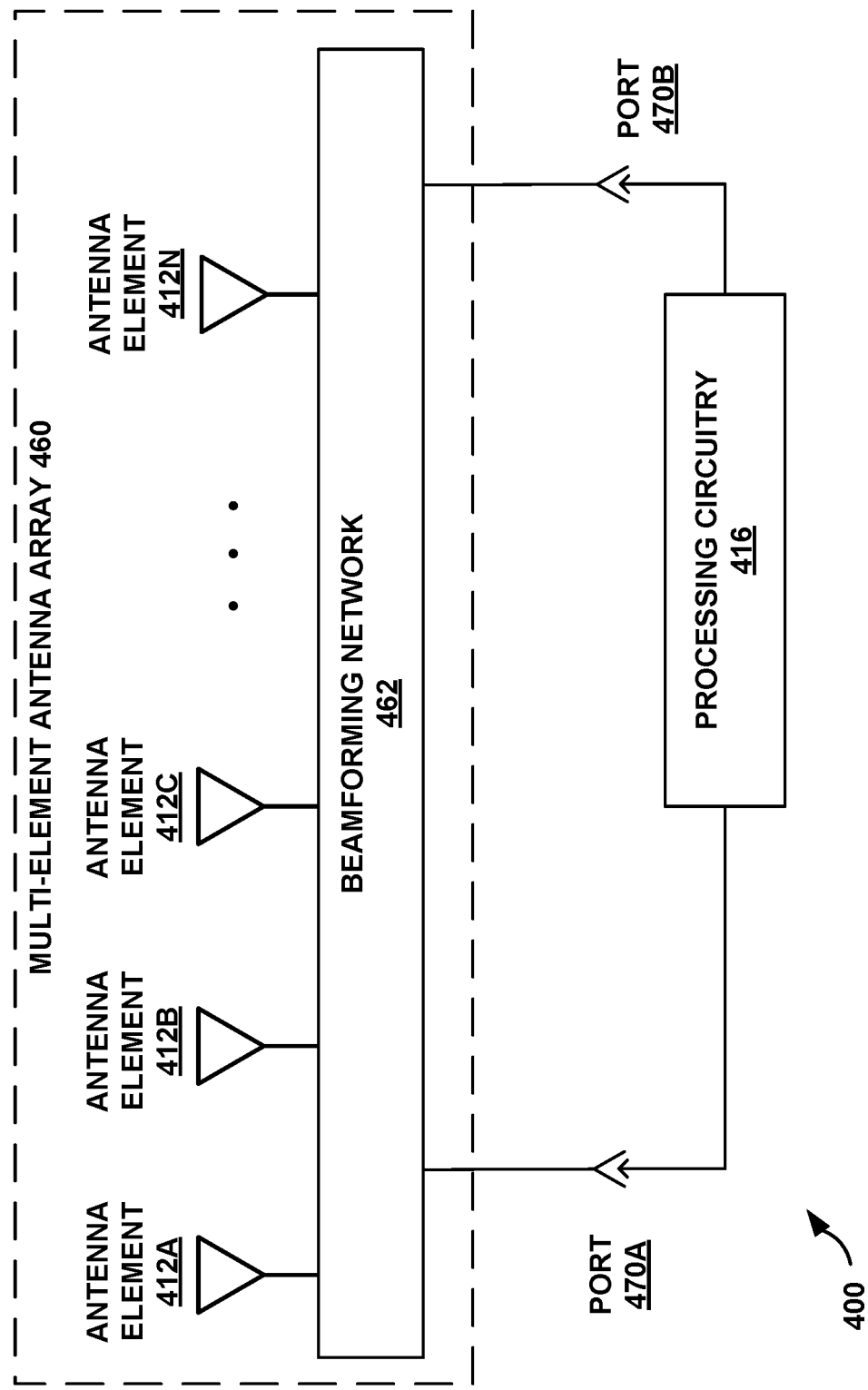
FIG. 4 is a block diagram illustrating an example multi-element antenna system, in accordance with some examples of this disclosure.

FIG. 4 is a block diagram illustrating an example multi-element antenna system 400 according to one or more techniques of this disclosure. The multi-element antenna system 400 is an example of systems 110, 210A, 210B, and 310 described above in relation to FIGS. 1-3. System 400 may include a TCAS device for transmitting Mode C interrogation messages and receiving Mode C reply messages. Additionally or alternatively, the TCAS device may be configured to transmit Mode S interrogation messages, transmit ADS-B messages, and receive ADS-B messages.

System 400 may include beamforming network 462 of multi-element antenna array 460 and processing circuitry 416. Multi-element antenna array 460 is a multiple element antenna array that includes beamforming network 462 and at least two antenna elements 412A-412N. Antenna elements 412A-412N may conduct RF transmit energy signals received from processing circuitry 416 via beamforming network 462 into open space. Antenna elements 412A-412N may also conduct RF energy signals received by antenna elements 412A-412N from other transmitters (e.g., other vehicles) to beamforming network 462. In some examples, multi-element antenna array 460 may be described as a passive phased array, in contrast to an active phased array. Multi-element antenna array 460, along with input ports 470A and 470B, and in some examples, may collectively be referred to as an antenna device, a TCAS antenna or a TCAS antenna system.

In this disclosure, an antenna array may simply be referred to as an antenna. An antenna may include several antenna elements i.e. radiating elements and receiving elements. In some examples, antenna elements may only transmit or only receive, rather than both transmit and receive. Additional example details of surveillance antennas are described in commonly assigned U.S. Pat. No. 9,997,826, entitled "Two-Element Traffic Collision Avoidance System (TCAS) Antenna," issued on Jun. 12, 2018, the entire contents of which are incorporated herein by reference.

Processing circuitry 416 may send surveillance messages to ports 470A and 470B which cause antenna elements 412A-412N to transmit omni-directional-beam signals, such as transmit beam 120 shown in FIG. 1. In other words, ports 470A and 470B are configured to receive input signals comprising a surveillance message and conduct the signals to beamforming network 462. As described above, the direction of the 180-degree beam may be controlled by the phase relationship between the signals input to ports 470A and 470B.

Beamforming network 462 may be a form of RF circuitry that combines the multiple antenna radiating element inputs/outputs, e.g. of antenna elements 412A-412N, with closely controlled phase and amplitude relationships. In the example of system 410, beamforming network 462 is a dual input RF circuit. In other examples, beamforming network 302 may have two or more inputs. By determining phase differences and timing differences between RF signals received by antenna elements 412A-412N, processing circuitry 416 may determine a direction from which an RF signal was received, i.e. the angle of arrival.

Processing circuitry 416 may be configured to demodulate surveillance messages received by multi-element antenna array 460 to determine data in the surveillance messages. Processing circuitry 416 may include any suitable arrangement of hardware, software, firmware, or any combination thereof, to perform the techniques attributed to processing circuitry 416 herein. Examples of processing circuitry 416 include any one or more microprocessors, digital signal processors (DSPs), application specific integrated circuits (ASICs), field programmable gate arrays (FPGAs), or any other equivalent integrated or discrete logic circuitry, as well as any combinations of such components. In some examples, processing circuitry 416 may include an FPGA such as the XC7A200T manufactured by Xilinx of San Jose, Calif. When processing circuitry 416 includes software or firmware, processing circuitry 416 further includes any hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Processing circuitry 416 may be communicatively coupled to memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to processing circuitry 416 (e.g., may be external to a package in which processing circuitry 416 is housed).

Figure 5:
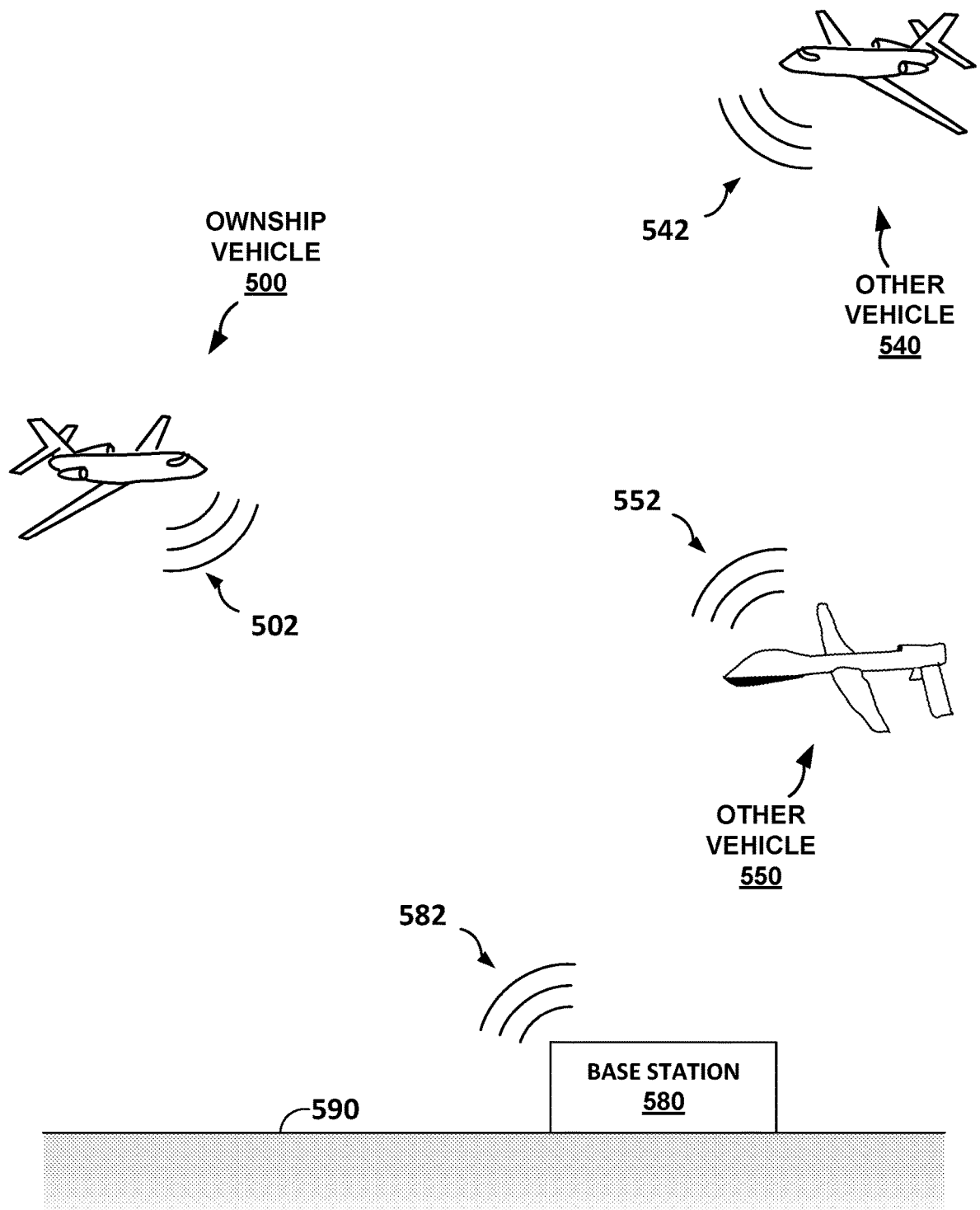
FIG. 5 is a conceptual block diagram of vehicles and a ground station sending and receiving surveillance messages, in accordance with some examples of this disclosure.

FIG. 5 is a conceptual block diagram of vehicles 500, 540, and 550 and a ground station 580 sending and receiving surveillance messages 502, 542, 552, and 582, in accordance with some examples of this disclosure. The example of FIG. 5 illustrates three vehicles 500, 540, and 550 sending and receiving surveillance messages 106, 166, and 176, in accordance with some examples of this disclosure. Base station 580 can also send and receive surveillance messages 582 in communication with vehicles 500, 540, and 550. Vehicle 500 is referred to as the "ownship vehicle," because FIG. 5 is described from the perspective of a system of this disclosure mounted onboard vehicle 500. Although vehicles 500, 540, and 550 are depicted in FIG. 5 as aircraft, vehicles 500, 540, and 550 can be any other vehicle or non-vehicle mobile object.

In some examples, vehicles 500, 540, and 550 may include large commercial aircraft that may be equipped with a suite of sensors, communication equipment, a flight management system, and other equipment. Some examples of airborne sensors that may be aboard vehicles 500, 540, and 550, or other airborne platforms may include radar such as weather radar, ground avoidance radar, radar altimeter, and other active sensors. Passive sensors may include thermometer, pressure sensors, optical sensors such as cameras, including infrared cameras, and similar passive sensors. In some examples, aircraft may be equipped for ADS-B transmissions (e.g. ADS-B-In and ADS-B-Out) and other communication, which may provide weather, traffic and collision avoidance information. In some examples vehicles 500, 540, and 550 may communicate with each other, and with ATC via voice radio or text based systems such as CPDLC.

Base station 580 can be any entity based on ground surface 250 that transmits and/or receives surveillance messages. Base station 580 can also be a marine or an airborne entity. Base station 580 may aggregate and distribute position and velocity data for vehicles 500, 540, and 550. In some examples, base station 580 may be part of a network of base stations that communicate with vehicles 500, 540, and 550 as well as ATC, weather centers and other entities.

Each of vehicles 500, 560, and, 570 can determine its location and speed using systems onboard the vehicle. Each of vehicles 500, 540, and 550 may include a Global Navigation Satellite System, an inertial navigation system for determining a turn rate, velocity, and acceleration for the respective vehicle 500, 540, or 550. Each of vehicles 500, 540, and 550 may include an altimeter, an accelerometer, an attitude and heading reference system, and/or other sensors and means for determining altitude, velocity, and other parameters of the respective vehicle 500, 540, or 550.

Vehicles 500, 540, and 550 can transmit surveillance messages 502, 542, and 552 indicating the locations and speeds of vehicles 500, 540, and 550. Surveillance messages 502, 542, and 552 may be periodic, unprompted broadcasts and/or replies to interrogation messages received from vehicles 500, 540, and 550 and/or base station 580. In some examples, more than one vehicle in an area may be transmitting interrogation messages at regular intervals. To reduce the likelihood that the interrogation messages sent by two vehicles will overlap at a receiving vehicle for every interrogation message sent, the transmitting vehicles may be configured to randomly jitter their interrogation times.

In examples in which each of vehicles 500 and 540 are transmitting interrogation messages once per second, each of vehicles 500 and 540 may be configured to randomly vary the intervals between transmissions, for example, by up to one, two, or three hundred milliseconds. In other words, vehicle 500 may be configured to use a first pause between transmitting a first pair of successive surveillance messages and a second pause between transmitting a second pair of successive surveillance messages. Vehicle 500 may be configured to vary the second pause by at least ten percent of the first pause, such that if a duration of the first pause is one second, a duration of the second pause is less than nine hundred milliseconds or greater than eleven hundred milliseconds.

Jittering transmission times can prevent vehicle 500 from incorrectly determining that reply messages sent by vehicle 550 in response to interrogations by vehicle 540 are in response to the interrogations sent by vehicle 500. Vehicle 500 may be configured to use the response time for a reply to determine the range of the replying vehicle, so an incorrect determination of which interrogation is being replied to can result in an incorrect range determination for the replying vehicle.

In one example, ownship vehicle 500 transmits an interrogation message using an omni-directional beam. If vehicle 540 is 1.5 miles away from vehicle 500, and vehicle 550 is 1.7 miles away from vehicle 500, vehicle 540 will receive the interrogation message before vehicle 550 receives the interrogation message. Each of vehicles 540 and 550 will respond to the interrogation message by sending a reply message to vehicle 500, where each reply message indicates data of the transmitting vehicle, such as the altitude of the transmitting vehicle. The response times of each of vehicles 540 and 550 may be approximately equal.

Thus, vehicle 500 will begin receiving the reply message sent by vehicle 540 before vehicle 500 begins receiving the reply message sent by vehicle 550. However, there may be temporal overlap in the reply messages received by vehicle 500. For example, the duration of each reply message may be equivalent to the time that it takes a message to travel 0.7 miles. Consequently, before vehicle 500 receives the final portion of the reply message sent by vehicle 540, vehicle 500 will receive the first portion of the reply message sent by vehicle 550. During the time period of overlap between the two reply messages, an antenna onboard vehicle 500 may be receiving the radio-frequency energy of both reply messages. This energy will overlap and corrupt the reply messages.

By forming multiple, simultaneous receive beams, vehicle 500 may be able to demodulate both reply messages, even if the messages overlap each other. For example, if a system onboard vehicle 500 forms a forward-facing beam and an aft-facing beam, the system may be able to discriminate between the reply messages if vehicle 540 is ahead of vehicle 500 and vehicle 550 is behind vehicle 500. The reply message sent by vehicle 540 may be covered by the forward-facing beam, and the reply message sent by vehicle 550 may be covered by the aft-facing beam. By comparison, if vehicle 500 is listening omni-directionally, vehicle 500 may not be able to de-interleave the overlapping reply messages sent by vehicles 540 and 550.

Figure 6:
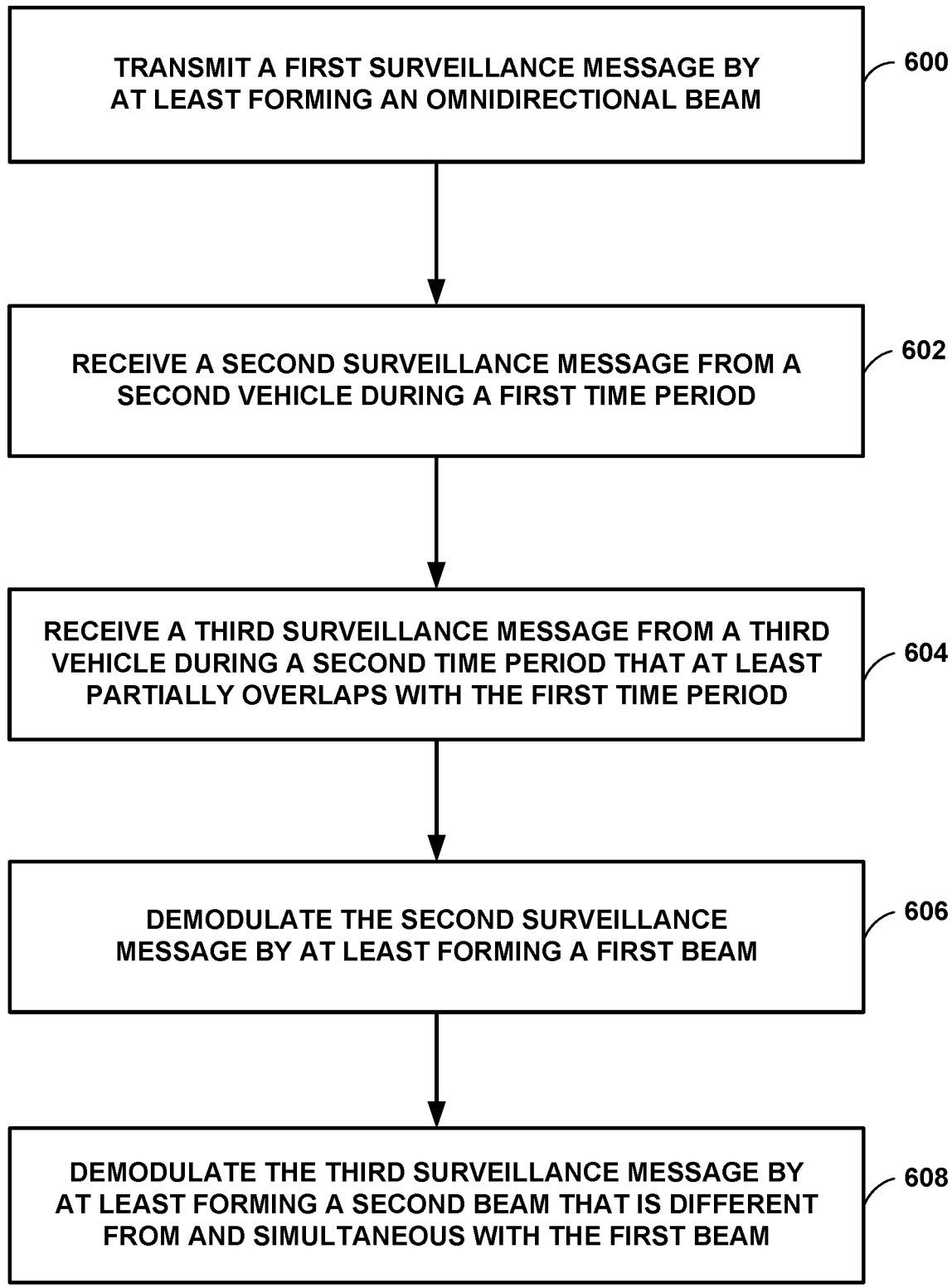
FIG. 6 is a flowchart illustrating an example process for transmitting and receiving surveillance messages, in accordance with some examples of this disclosure.

FIG. 6 is a flowchart illustrating an example process for transmitting and receiving surveillance messages, in accordance with some examples of this disclosure. The example process of FIG. 6 is described with reference to system 410 shown in FIG. 4, although other components may exemplify similar techniques.

In the example of FIG. 6, multi-element antenna array 460 transmits a first surveillance message by at least forming an omni-directional beam (600). The first surveillance message may be a Mode C interrogation message. System 410 may be configured to cause multi-element antenna array 460 to transmit an omni-directional beam by at least delivering a signal to only one of ports 470A or 470. Transmitting out of just one of ports 470A and 470B may create an omni-directional pattern. In some examples, system 410 may be configured to transmit surveillance messages by at least forming a beam with a beamwidth that is greater than 180 degrees, rather than an omni-directional beam.

In the example of FIG. 6, multi-element antenna array 460 receives a second surveillance message during a first time period (602). Multi-element antenna array 460 also receives a third surveillance message during a second time period that at least partially overlaps with the first time period (604). The second and third surveillance messages may be Mode C reply messages sent by other vehicles in response to the Mode C interrogation message. Processing circuitry 416 demodulates the second surveillance message by at least forming a first beam (606). Processing circuitry 416 also demodulates the third surveillance message by at least forming a second beam that is different from the first beam (608). The first beam may be formed simultaneously by system 410 with the formation of the second beam. Either of processing circuitry 416 and/or beamforming network 462 may be configured to form the receive beams.

Processing circuitry 416 and/or beamforming network 462 may be configured to listen to both of ports 470A and 470B and perform phase shifting internally in software or firmware. Processing circuitry 416 and/or beamforming network 462 may be configured to control the direction of a beam (e.g., steer the beam) by at least controlling a phase shift between ports 470A and 470B. Processing circuitry 416 and/or beamforming network 462 can control a phase shift by at least taking the phase difference between the signals at ports 470A and 470B.

Processing circuitry 416 and/or beamforming network 462 may be configured to form receive beams by at least forming a first receive beam that is different than a second receive beam, such that the first and second beams do not fully overlap. In addition, processing circuitry 416 and/or beamforming network 462 may be configured to analyze or process the receive beams separately, rather than summing the receive beams for omni-directional listening.

The following numbered examples demonstrate one or more aspects of the disclosure.

Example 1. A method includes transmitting, by an antenna mounted on a first vehicle, a first surveillance message. The method also includes receiving, by the antenna, at least two surveillance messages from other vehicles. The method includes demodulating, by processing circuitry coupled to the antenna, the at least two surveillance messages by at least forming two or more simultaneous beams.

Example 2. The method of example 1, wherein transmitting the first surveillance message includes forming an omni-directional beam.

Example 3. The method of example 1 or example 2, wherein transmitting the first surveillance message includes transmitting an interrogation message.

Example 4. The method of examples 1-3 or any combination thereof, wherein transmitting the first surveillance message includes transmitting an interrogation message.

Example 5. The method of examples 1-4 or any combination thereof, wherein the transmitting the first surveillance message includes transmitting a Mode C interrogation message.

Example 6. The method of examples 1-5 or any combination thereof, further including forming the two or more simultaneous beams regardless of the number of overlapping reply messages (e.g., zero, one, two, three, or another number of reply messages).

Example 7. The method of examples 1-6 or any combination thereof, further including forming the two or more simultaneous beams regardless of the number of vehicles transmitting reply messages (e.g., zero, one, two, three, or another number of vehicles).

Example 8. The method of examples 1-7 or any combination thereof, wherein receiving the at least two surveillance messages includes receiving a second surveillance message from a second vehicle and receiving a third surveillance message from a third vehicle.

Example 9. The method of example 8, wherein the antenna receives the second surveillance message at a first time, and wherein the antenna receives the third surveillance message at a second time.

Example 10. The method of example 8 or example 9, wherein the first and second time periods at least partially overlap in time.

Example 11. The method of examples 1-10 or any combination thereof, wherein receiving the at least two surveillance messages includes receiving at least two reply messages in response to the first surveillance message.

Example 12. The method of examples 1-11 or any combination thereof, wherein receiving the at least two surveillance messages includes receiving at least two Mode C reply messages in response to the first surveillance message.

Example 13. The method of examples 1-12 or any combination thereof, wherein a bandwidth of each beam of the two or more simultaneous beams is between 160 and 200 degrees.

Example 14. The method of examples 1-13 or any combination thereof, wherein forming the two or more simultaneous beams includes forming a first beam of the two or more simultaneous beams towards a front end of the first vehicle.

Example 15. The method of examples 1-14 or any combination thereof, wherein forming the two or more simultaneous beams includes forming a second beam of the two or more simultaneous beams towards a back end of the first vehicle.

Example 16. The method of examples 1-15 or any combination thereof, wherein forming the two or more simultaneous beams includes forming three simultaneous beams including the two or more simultaneous beams.

Example 17. The method of example 16, wherein a bandwidth of each beam of the three simultaneous beams is between 100 and 140 degrees.

Example 18. The method of example 16 or example 17, wherein a bandwidth of each beam of the three simultaneous beams is between 160 and 200 degrees.

Example 19. The method of examples 1-18 or any combination thereof, wherein forming the two or more simultaneous beams includes forming four simultaneous beams including the two or more simultaneous beams.

Example 20. The method of example 19, wherein a bandwidth of each beam of the four simultaneous beams is between 70 and 110 degrees.

Example 21. The method of examples 19 or example 20, wherein a bandwidth of each beam of the four simultaneous beams is between 160 and 200 degrees.

Example 22. The method of examples 1-21 or any combination thereof, wherein transmitting the first surveillance message includes causing the antenna to form the omni-directional beam by at least delivering signals encoding the first surveillance message to only one port of the antenna.

Example 23. The method of examples 1-22 or any combination thereof, further including transmitting a fourth surveillance message following a first pause after transmitting the first surveillance message.

Example 24. The method of example 23, further including transmitting a fifth surveillance message following a second pause after transmitting the fourth surveillance message.

Example 25. The method of example 24, wherein a duration of the first pause is at least ten percent greater than a duration of the second pause.

Example 26. The method of example 25, wherein a duration of the first pause is at least ten percent less than a duration of the second pause.

Example 27. A system is configured to mount on a first vehicle. The system includes an antenna configured to transmit a first surveillance message by forming an omni-directional beam. The antenna is also configured to receive a second surveillance message from a second vehicle during a first time period. The antenna is further configured to receive a third surveillance message from a third vehicle during a second time period, where the first and second time periods at least partially overlap in time. The system also includes processing circuitry configured to demodulate the second surveillance message by forming a first beam and demodulate the third surveillance message by forming a second beam. The second beam is different than the first beam, and the first beam is simultaneous with the second beam.

Example 28. A TCAS device is configured to mount on a first vehicle. The TCAS device includes an antenna configured to transmit a Mode C interrogation message and receive one or more Mode C reply messages from other vehicles. The TCAS device also includes processing circuitry configured to demodulate the one or more Mode C reply messages by forming two or more simultaneous beams.

Example 29. The system of example 27 or the TCAS device of example 28, where the antenna and the processing circuitry are configured to perform the methods of examples 1-26 or any combination thereof.

Example 30. A device includes a computer-readable medium having executable instructions stored thereon, configured to be executable by processing circuitry for causing the processing circuitry to perform the methods of examples 1-26 or any combination thereof.

Example 31. A system including means for performing each of the method steps of examples 1-26 or any combination thereof.

This disclosure has attributed functionality to systems 110, 210A, 210B, 310, and 410, processing circuitry 416, and beamforming network 462. Systems 110, 210A, 210B, 310, and 410, processing circuitry 416, and beamforming network 462 may include any combination of integrated circuitry, discrete logic circuitry, analog circuitry. For example, processing circuitry 416 may include one or more processors. In some examples, systems 110, 210A, 210B, 310, and 410, processing circuitry 416, and beamforming network 462 may include multiple components, such as any combination of one or more microprocessors, one or more DSPs, one or more ASICs, or one or more FPGAs, as well as other discrete or integrated logic circuitry, and/or analog circuitry. The techniques described in this disclosure may also be encoded in a non-transitory computer-readable storage medium, such as a memory coupled to systems 110, 210A, 210B, 310, and 410, processing circuitry 416, and beamforming network 462. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system configured to mount on a first vehicle, the system comprising:
   an antenna configured to:
      transmit a first surveillance message by at least forming an omni-directional beam;
      receive a second surveillance message from a second vehicle during a first time period; and
      receive a third surveillance message from a third vehicle during a second time period, wherein the first and second time periods at least partially overlap in time; and
   processing circuitry configured to:
      demodulate the second surveillance message by at least forming a first directional beam;
      demodulate the third surveillance message by at least forming a second directional beam, wherein the second directional beam is different than the first directional beam, and wherein the first directional beam is formed simultaneously with the second directional beam;
      transmit a fourth surveillance message following a first pause after transmitting the first surveillance message; and
      transmit a fifth surveillance message following a second pause after transmitting the fourth surveillance message, wherein a duration of the first pause is at least ten percent greater than a duration of the second pause or the duration of the first pause is at least ten percent less than the duration of the second pause.

2. The system of claim 1, wherein a beamwidth of each directional beam of the first and second directional beams is between 160 and 200 degrees.

3. The system of claim 1, wherein the processing circuitry is configured to:
   form the first directional beam towards a front end of the first vehicle; and
   form the second directional beam towards a back end of the first vehicle.

4. The system of claim 1, wherein the processing circuitry is configured to form three simultaneous directional beams including the first and second directional beams.

5. The system of claim 4, wherein a beamwidth of each directional beam of the three simultaneous directional beams is between 100 and 140 degrees.

6. The system of claim 1, wherein the processing circuitry is configured to form four simultaneous directional beams including the first and second directional beams.

7. The system of claim 6, wherein a beamwidth of each directional beam of the four simultaneous directional beams is between 70 and 110 degrees.

8. The system of claim 6, wherein a beamwidth of each directional beam of the four simultaneous directional beams is between 160 and 200 degrees.

9. The system of claim 1,
wherein the first surveillance message includes an interrogation message, and
wherein the second and third surveillance messages include a reply message.

10. A method comprising:
transmitting, by an antenna mounted on a first vehicle, a first surveillance message by at least forming an omni-directional beam;
receiving, by the antenna, a second surveillance message from a second vehicle during a first time period;
receiving, by the antenna, a third surveillance message from a third vehicle during a second time period, wherein the first and second time periods at least partially overlap in time;
demodulating, by processing circuitry coupled to the antenna, the second surveillance message by at least forming a first directional beam; and
demodulating, by the processing circuitry, the third surveillance message by at least forming a second directional beam, wherein the second directional beam is different than the first directional beam, and wherein the first directional beam is formed simultaneously with the second directional beam;
transmitting, by the antenna, a fourth surveillance message following a first pause after transmitting the first surveillance message; and
transmitting, by the antenna, a fifth surveillance message following a second pause after transmitting the fourth surveillance message, wherein a duration of the first pause is at least ten percent greater than a duration of the second pause or the duration of the first pause is at least ten percent less than the duration of the second pause.

11. The method of claim 10, wherein a beamwidth of each directional beam of the first and second directional beams is between 160 and 200 degrees.

12. The method of claim 10, further comprising:
forming the first directional beam towards a front end of the first vehicle; and
forming the second directional beam towards a back end of the first vehicle.

13. The method of claim 10, further comprising:
forming four simultaneous directional beams including the first and second directional beams,
wherein a beamwidth of each directional beam of the four simultaneous directional beams is between 70 and 110 degrees.

14. The method of claim 10,
wherein the first surveillance message includes a traffic collision avoidance system interrogation message, and
wherein the second and third surveillance messages include a transponder reply message.

15. A system configured to mount on a first vehicle, the system comprising:
an antenna configured to:
transmit a first surveillance message by at least forming an omni-directional beam;
receive a second surveillance message from a second vehicle during a first time period; and
receive a third surveillance message from a third vehicle during a second time period, wherein the first and second time periods at least partially overlap in time; and
processing circuitry configured to:
cause the antenna to form the omni-directional beam by at least delivering signals encoding the first surveillance message to only one port of the antenna.
demodulate the second surveillance message by at least forming a first directional beam;
demodulate the third surveillance message by at least forming a second directional beam, wherein the second directional beam is different than the first directional beam, and wherein the first directional beam is formed simultaneously with the second directional beam.

16. The system of claim 15, wherein the processing circuitry is configured to:
form the first directional beam towards a front end of the first vehicle; and
form the second directional beam towards a back end of the first vehicle.

17. The system of claim 15, wherein the processing circuitry is configured to form three simultaneous directional beams including the first and second directional beams.

18. The system of claim 15,
wherein the first surveillance message includes an interrogation message, and
wherein the second and third surveillance messages include a reply message.

19. The system of claim 15, wherein the processing circuitry is configured to form four simultaneous directional beams including the first and second directional beams.

20. The system of claim 15, wherein a beamwidth of each directional beam of the first and second directional beams is between 160 and 200 degrees.

* * * * *